June 5, 1928.
S. RINGSTOD
1,672,090
SPRING WHEEL
Filed May 26, 1927
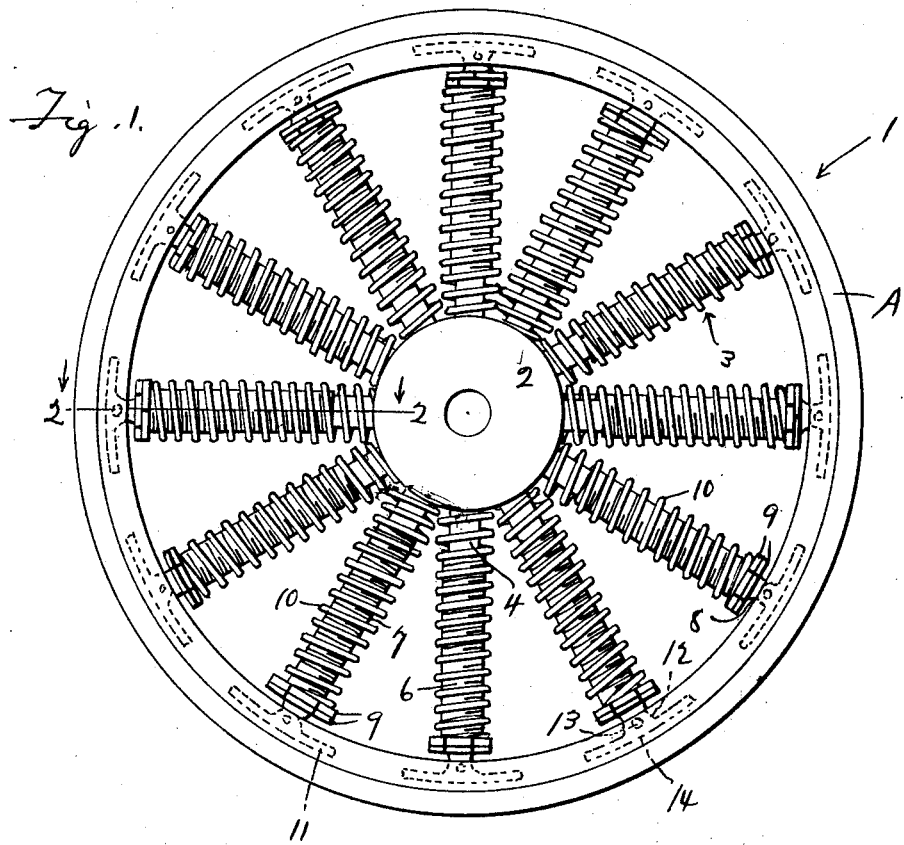
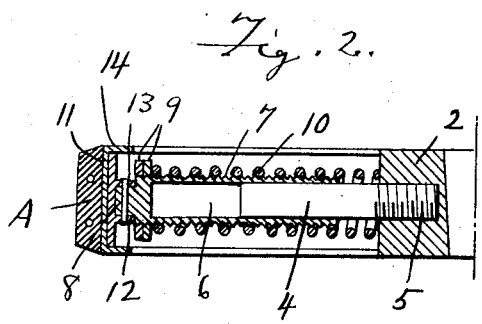
Inventor
Svend Ringstod
By Clarence A. O'Brien
Attorney Patented June 5, 1928.

UNITED STATES PATENT OFFICE.

SVEND RINGSTOD, OF PHILADELPHIA, PENNSYLVANIA.

SPRING WHEEL.

Application filed May 26, 1927. Serial No. 194,337.

The present invention relates to improvements in spring wheels and has for its principal object to provide a wheel construction wherein the same includes a plurality of spring controlled telescopic spokes, which radiate from a hub, an inwardly channeled rim being provided for receiving slidable shoes carried by the outer ends of the spokes.

One of the important objects of the present invention is to provide a spring wheel, wherein the resilient qualities provided by the present construction will be as effective as a wheel equipped with a pneumatic tire, a solid tire being used in conjunction with the present type of wheel, thereby eliminating any possibility of a puncture.

A further object is to provide a spring wheel of the above mentioned character, which is simple in construction, strong and durable, and further well adapted to the purpose for which it is designed.

Other objects and advantages of the invention will become apparent during the course of the following detailed description.

In the accompanying drawing, forming a part of this application, and wherein like reference characters designate like parts throughout the views:

Figure 1 is a side elevation of the spring wheel embodying my invention, and

Figure 2 is a sectional view, taken substantially on the line 2—2 of Figure 1.

In the drawing, wherein for the purpose of illustration is shown the preferred embodiment of my invention, the numeral 1 designates generally my improved spring wheel, the same comprising the hub 2. Extending radially from the hub 2 are the spring controlled telescopic spokes designated generally by the numeral 3, twelve of such spokes being shown in the present instance.

Each spoke comprises a rod 4, which is threaded at its inner end in a threaded socket 5, provided therefor in the periphery of the hub 2 and this construction is clearly shown in Figure 2. Disposed over the outwardly projecting portion of the rod 4 is the tubular section 6, the same being externally threaded, as shown at 7. The outer end of this tubular section is closed and extending from the closed outer end is the reduced portion 8, the purpose of which will be presently described. A pair of nuts 9 are threaded on the tubular member 6 and provide a means for adjusting the tension of an expansible coil spring 10, which encircles the tubular member 6 and the rod 4, over which the tubular member telescopes, one end of the spring engaging the peripheral face of the hub 2, while the opposite end engages the innermost one of the pair of lock nuts 9.

A substantially longitudinally curved shoe 11 in the form of a plate is formed on its inner face with a pair of inwardly projecting ears or lugs 12, adapted for disposition on opposite sides of the reduced end 8 of each spoke, and a pivot pin 13 extends through suitable registering openings provided therefor in the reduced portion 8 and the inwardly projecting ears or lugs 12, whereby the shoe 11 is pivotally carried by the outer end of each spoke.

The invention further comprehends the provision of an inwardly channeled rim 14 and the curved shoes 11 are adapted for disposition within the inwardly channeled rim 14, in the manner as clearly shown in the drawing. These shoes are disposed between the sides of the channeled rim and the expansible coil spring 10 which encircles each spoke, normally urges the closed outer end of the shell outwardly, so that the outer face of the curved shoe will be maintained in engagement with the inner face of the tire supporting portion of the rim and these shoes will be adapted for slidable movement within the rim in a manner readily obvious from the construction shown in the drawing. A solid cushion tire A is mounted on the rim 14, in any appropriate manner and when the parts are assembled, they will be disposed in the manner shown in Figure 1 and the springs 10 will urge the telescopic sections of the spokes in opposite directions whereby to maintain the hub of the wheel in the proper position.

It will be readily obvious that when the cushioned tire A comes in contact with the ground, certain of the springs will be placed under compression and certain of the shoes will slide within the inwardly channeled rim and as soon as this portion of the wheel moves out of engagement with the ground, the expansible springs will automatically resume their proper and normal positions and furthermore move the slidable shoes to their proper positions with respect to the rim.

The simplicity of my device enables the spring wheel to be at all times positive and efficient in carrying out the purposes for which it is designed and furthermore such a wheel may be constructed at a very low cost, and will be strong and durable.

While I have shown the preferred embodiment of my invention, it is to be understood that various changes in the size, shape and arrangement of parts may be resorted to, without departing from the spirit of the invention or the scope of the appended claim.

What is claimed is:

A spring wheel comprising a hub, spring controlled telescopic spokes radiating therefrom, each of said spokes including a rod section secured at its inner end in the periphery of the hub, a tubular section slidably receiving the rod section, the outer end of the tubular section being closed and formed with a reduced end, an expansible coil spring encircling the sections of each spoke, an inwardly channeled rim, curved shoes slidably disposed within the channeled rim, each of said shoes being formed with a pair of inwardly projecting lugs on the inner face thereof for disposition on opposite sides of the reduced end portion of the outer end of each of the tubular sections of the spokes, and a pivot pin extending through the reduced end and said inwardly extending lugs for operatively connecting said shoe to the outer end of said spoke.

In testimony whereof I affix my signature.

SVEND RINGSTOD.